UNITED STATES PATENT OFFICE.

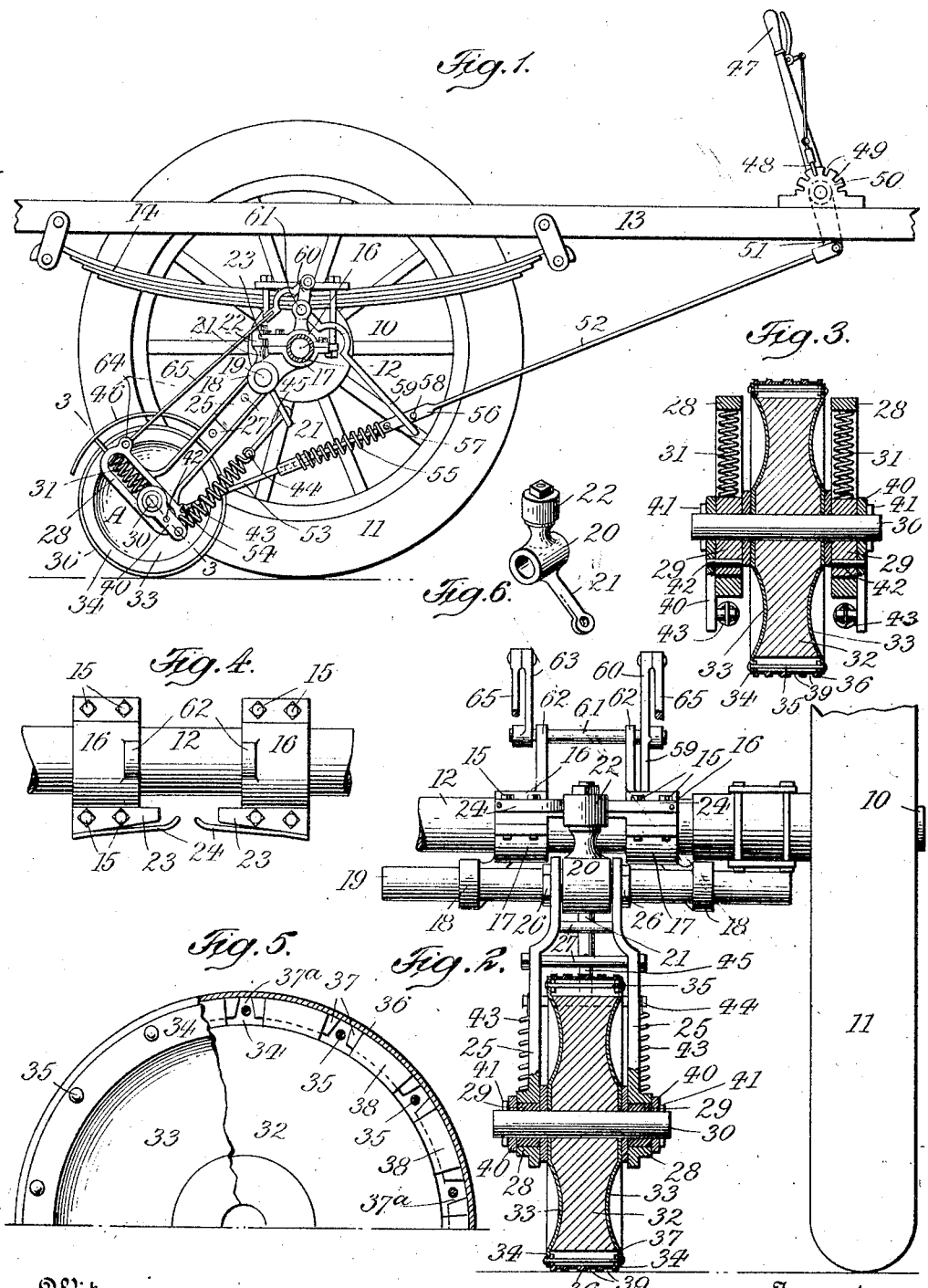

AUGUST HORMEL, OF NEW YORK, N. Y.

ANTISKIDDING DEVICE FOR AUTOMOBILES.

991,445.  Specification of Letters Patent.  Patented May 2, 1911.

Application filed August 12, 1910. Serial No. 576,869.

*To all whom it may concern:*

Be it known that I, AUGUST HORMEL, a citizen of the United States, and resident of New York city, county and State of New York, have invented new and useful Improvements in Antiskidding Devices for Automobiles, of which the following is a specification.

This invention relates to novel means for preventing any skidding action of the rear wheels of automobiles and similar vehicles. These means comprise essentially a trailer which depends from the vehicle, near the rear end thereof, and which will be automatically forced against the ground upon a lateral movement of the rear vehicle wheels, so as to effectively check said movement.

The invention further comprises novel means for absorbing any shocks imparted to the trailer during the traveling of the vehicle.

In the accompanying drawing: Figure 1 is a sectional side view of part of an automobile embodying my invention; Fig. 2 a sectional rear view, partly broken away, of Fig. 1; Fig. 3 a section on line 3—3, Fig. 1; Fig. 4 a detail of the V-shaped guide; Fig. 5 a sectional side view, partly broken away of the trailer, and Fig. 6 a detail of the trailer-actuating lever.

The rear axle 10 of the automobile, carrying driving wheels 11 is inclosed within a tubular casing 12, which is, in turn, connected to the automobile frame 13 by springs 14, as usual. To casing 12 are clamped by screws 15 a pair of split rings, each composed of sections 16, 17, the lower ring sections 17 being provided with alined bearings 18 adapted for the reception of an axially displaceable arbor 19. Upon the latter turns loosely the hub 20 of an elbow lever 21, the upper arm of said lever carrying an anti-friction roller 22. This roller is adapted to engage a pair of inclined rails 23 clamped to the upper ring sections 16 by screws 15 and constituting jointly a V-shaped guide. The rear edges of rails 23 are provided with flat springs 24 that normally diverge from said edges, said springs serving to absorb the shock, when roller 22 moves to the right or left from its normal inactive position. Hub 20 is straddled by a pair of arms 25 which are held to arbor 19 by nuts 26, said arms being connected to each other by screw bolts 27. At their lower ends, arms 25 are provided with transversely disposed oblong eyes or guides 28 set at or about right angles to arm 25 and encompassing slide blocks 29 that constitute the bearings of a transverse axle 30, blocks 29 being normally depressed by springs 31. Intermediate arms 25, axle 30 carries a friction wheel or trailer A which consists preferably of a recessed wooden core 32 flanked by correspondingly shaped metal disks 33, the peripheral flanges 34 of which project beyond core 32 and are connected by screw bolts 35. Intermediate flanges 34 is loosely received a ring 36 provided with inwardly extending flanges 37 that are straddled by flanges 34, flanges 37 being cut away as at 37ª to accommodate bolts 35. Between core 32 and ring 36 there are interposed a plurality of rubber blocks or similar shock absorbing cushions 38.

The relative dimensions of flanges 37 and cushions 38 are such that the latter will only absorb the initial shocks whereupon the flanges in contact with the ground will become seated upon core 32 to be effectively forced against the ground in manner hereinafter described. Ring 36 is provided with circumferential grooves 39 so as to cause the trailer to obtain a firm grip on the supporting ground. At its free ends, axle 30 carries fingers 40, held in position by pins 41, while any movement of said fingers relatively to blocks 29 is prevented by bolts 42 extending through said fingers and blocks. To the free lower ends of fingers 40 are secured springs 43 which are in turn connected to a cross arm 44 of a rod 45 attached to the lower arm of elbow lever 21. A mud guard 46 carried by arms 25 and eyes 28 partly surrounds trailer A and protects the car body from flying mud.

Means are provided for raising the trailer off the ground so as to render the same inoperative whenever desired. These means are shown to consist of a hand lever 47 pivoted to frame 13 and adapted to be locked in position by a bolt 48 entering corresponding notches 49 of a fixed sector 50. To the lower extension 51 of lever 47 is fulcrumed one end of a sectional rod 52, 53, the other end of which is pivoted to a lug 54 of one of the eyes 28. Rod sections 52, 53, are connected by a spring 55 that tends to contract said sections. The lower flattened end 56 of section 52 is provided with a pair of laterally projecting abutments 57, 58 between which plays the shank 59 of an elbow lever 59, 60. This elbow lever is fast on one end of an arbor 61 that turns loosely in a pair of bearings 62 extending upwardly from upper ring sections 16. To the other end of arbor 61 is secured a lever 63, the shank 60 and lever 63 being connected to lugs 64 of eyes 28 by articulated links 65.

It will be seen that by tilting lever 47 forward, abutment 58 will swing shank 59 backward, so that shank 60 and lever 63 will, through links 65, raise arms 25 and trailer A off the ground. As during this movement, the pivots of shank 60, lever 63 and links 65 will be lowered beyond the straight line connecting arbor 61 and lugs 64, trailer A will by its own weight be maintained in its raised position. When however the roads are wet and slippery, lever 47 is swung backward, to tilt shank 59 forward and thereby lower trailer A, springs 31, 43 and 55 tending to yieldingly force the trailer against the ground. Should wheels 11 swerve laterally, trailer A will not participate in this axial movement of the wheels, because its grooved circumference insures a firm grip on the ground. But as V-shaped guide 23 participates in the lateral movement of rails 11, the upper member of lever 21 will be swung backward, thereby raising its lower arm. Springs 43 being thus placed under tension, will tend to swing arms 25 forward and thus increase the friction between trailer A and the supporting ground. It will be seen that the greater the lateral movement of wheels 11, the greater becomes the pressure with which the trailer is forced against the ground, so as to effectively check any objectionable skidding. Owing to the rearward deflection of arms 25 relatively to the direction of car travel, and owing to the disposition of guides 38 at about right angles to said arms, any obstructions on the road bed will impart to the trailing wheel an impetus that extends substantially along the longitudinal axis of said guide. These shocks are absorbed by the springs 31 arranged along said guide without in any way changing the position of arms 25, so that a smooth traveling of the car is insured.

It is obvious that in lieu of mounting the device on the casing of the driving axle, it may be secured to the automobile frame without departing from the spirit of my invention.

I claim:

1. A device of the character described, comprising a vehicle body, a rearwardly extending and laterally slidable arm pivotally suspended therefrom and provided with a transversely disposed guide, a block movable along said guide, a trailer hung in the block, and a spring engaging the block and exerting a downward pressure on said trailer along the axis of the guide.

2. A device of the character described, comprising a vehicle body, a rearwardly extending and laterally slidable arm pivotally suspended therefrom and provided with a transversely disposed slotted guide, a block movable within the guide-slot, a trailer hung in the block, and a spring accommodated within said slot and engaging the block, said spring exerting a downward pressure on said trailer along the axis of the guide.

3. A device of the character described, comprising a vehicle body, a pivoted arm adapted to swing in a longitudinal direction and laterally displaceable relatively to said body, a trailer yieldingly journaled in said arm, a sectional spring-influenced rod fulcrumed to the arm and adapted to raise the trailer off the ground, an elbow lever operatively connected to the rod, and a link connecting said lever to the arm.

4. A device of the character described, comprising a vehicle body, a pivoted arm adapted to swing in a longitudinal direction and laterally displaceable relatively to said body, a trailer yieldingly journaled in said arm, a sectional spring-influenced rod fulcrumed to the arm and adapted to raise the trailer off the ground, a pair of abutments on said rod, an elbow-lever adapted to be engaged by said abutments, and a link connecting said lever to the arm.

5. A device of the character described, comprising a vehicle body, a pivoted arm laterally displaceable relatively thereto and having an elongated eye projecting at substantially right angles to the arm, a trailer yieldingly journaled in said eye, a manually operable rod fulcrumed to said eye, a pair of abutments on said rod, an elbow lever adapted to be engaged by said abutments, and a link connecting said lever with the eye.

AUGUST HORMEL.

Witnesses:
ARTHUR E. ZUMPE,
DANIEL HOLMGREN.